US010300425B2

(12) United States Patent
Adams et al.

(10) Patent No.: US 10,300,425 B2
(45) Date of Patent: May 28, 2019

(54) APPARATUS FOR REMOVING OIL AND MOISTURE FROM A GAS (71) Applicant: Arrow Pneumatics, Inc., Broadview, IL (US)

(72) Inventors: Larry Adams, Rockford, IL (US); Steve Fligel, Berwyn, IL (US); Benny Kawa, Salem, VA (US)

(73) Assignee: Arrow Pneumatics, Inc., Broadview, IL (US)

( * ) Notice: Subject to any disclaimer, the term of this patent is extended or adjusted under 35 U.S.C. 154(b) by 398 days.

(21) Appl. No.: 15/274,578

(22) Filed: Sep. 23, 2016

(65) Prior Publication Data
US 2018/0085702 A1 Mar. 29, 2018

(51) Int. Cl.
*B01D 46/00* (2006.01)
*B01D 46/30* (2006.01)
*B01D 46/42* (2006.01)
*B01D 53/26* (2006.01)

(52) U.S. Cl.
CPC ..... *B01D 46/4254* (2013.01); *B01D 46/0004* (2013.01); *B01D 46/0036* (2013.01); *B01D 46/0086* (2013.01); *B01D 46/30* (2013.01); *B01D 53/261* (2013.01)

(58) Field of Classification Search
CPC ............ B01D 46/0004; B01D 46/0036; B01D 46/0086; B01D 46/4254; B01D 53/02; B01D 53/04; B01D 53/0415; B01D 53/261
See application file for complete search history.

(56) References Cited

U.S. PATENT DOCUMENTS

| 3,085,424 | A | * | 4/1963 | Berg | ................... | G01N 31/222 |
| | | | | | | 116/276 |
| 3,791,105 | A | | 2/1974 | Rhodes | | |
| 4,822,387 | A | | 4/1989 | Daniels | | |
| 4,957,516 | A | | 9/1990 | Daniels | | |
| 5,215,660 | A | | 6/1993 | Mosher et al. | | |
| 5,403,387 | A | | 4/1995 | Flynn et al. | | |
| 5,667,566 | A | * | 9/1997 | Flynn | .................. | B01D 53/261 |
| | | | | | | 96/117.5 |
| 5,846,271 | A | | 12/1998 | Flynn et al. | | |
| 5,910,165 | A | | 6/1999 | Haramoto et al. | | |

(Continued)

OTHER PUBLICATIONS

Arrow Pneumatics Catalog, "Clean, Dry Air Solutions", X7000.

*Primary Examiner* — Jason M Greene
(74) *Attorney, Agent, or Firm* — Wood, Phillips, Katz, Clark & Mortimer (57) ABSTRACT

An apparatus removing air from pressurized gas, including a pressure housing removably securable to a connection cap, a removable filter housing in the housing with moisture removing material in the filter housing, and an external indicator indicating that the apparatus is not removing at least some moisture. The cap includes an air flow exit for air which has passed through the filter housing. The indicator is on the cap and includes visible material which changes color when moisture is present. An aspirator tube diverts some air flow from the cap air flow exit into the indicator visible color changing material. The filter housing is transparent or translucent and includes oil removing material and a sintered disk before the moisture removing material.

9 Claims, 7 Drawing Sheets (56) References Cited

U.S. PATENT DOCUMENTS

| | | | |
|---|---|---|---|
| 7,544,234 B2 * | 6/2009 | Fornof | B01D 53/261 34/299 |
| 2005/0201893 A1 * | 9/2005 | Arno | B01D 53/04 96/117.5 |
| 2008/0005919 A1 | 1/2008 | Brown et al. | |
| 2008/0229605 A1 * | 9/2008 | Brown | B01D 53/261 34/73 |
| 2015/0040765 A1 * | 2/2015 | Zastera | B01D 53/261 96/117.5 |

* cited by examiner

APPARATUS FOR REMOVING OIL AND MOISTURE FROM A GAS

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to in-line dryers and more particularly to in-line dryers adapted to remove water vapor from a flow of compressed fluid, such as air.

BACKGROUND OF THE INVENTION

Compressed gases such as compressed air, nitrogen, oxygen, helium, etc. are used extensively throughout a wide spectrum of industries such as automotive, chemical, electronic, aerospace, oil refining and health care industries. There is often a need in these industries for compressed gas which is free of contaminants such as particulate matter, aerosols (liquid droplets), water vapor, oil vapor or other undesired agents. For example, if used to spray paint, it is important that oil, water and particulate matter be removed from the compressed air to prevent the paint from becoming contaminated, thereby ruining the paint finish. Similarly, if compressed air provides a source of breathing air, for example, by SCUBA divers, firemen, air crew members or hospital patients, it is critical that particulate and oil contaminants be removed from the air to prevent ingestion of the contaminants into the lungs of the person.

Gas compressors themselves are often the source of contaminants in compressed gas. Air drawn into a compressor, for example, is often not properly filtered at the compressor intake, thus allowing particulates commonly in the air, such as pollen, smoke, and dust, to be drawn in and introduced into the compressed air supply. The moving parts of compressors such as pistons or impellers are lubricated with oils which can vaporize, atomize, oxidize or otherwise breakdown due to agitation by the moving parts and the increase in temperature associated with compressing a gas. The lubricating oil or its breakdown by-products become entrained in the compressed gas either as an aerosol (oil droplets suspended in air) or a vapor (oil in the gaseous state) as the gas leaves the compressor. Further, water is a natural component of air, and unless deliberately removed, water will comprise a natural part of compressed air as well in both aerosol (water droplet) and vapor (gaseous) form.

Commonly, filters are used to remove such undesirable particulates from the gas. For example, Haramoto et al. U.S. Pat. No. 5,910,165 discloses a dryer in which desiccant is used as a filtering material to remove water from compressed air which is passed through the desiccant. In such filters, desiccant which changes color when saturated (e.g., from blue to pink) has also been used to indicate when the filter should be replaced. When the filter desiccant has changed almost fully from, for example, blue to pink, that is an indication that the desiccant (i.e., filter cartridge) should be replaced.

Often, filters have been enclosed in a pressure vessel and thus the filter is not visible unless the pressure vessel is opened. In that case, it is necessary for the user to periodically check the status (color) of the desiccant to see if it needs replacement, often resulting in unnecessarily early replacement (and wasting) of desiccant when the user sees that the desiccant is approaching saturation, because the user may worry that he will neglect to check the desiccant again until after it reaches saturation. In some filters (e.g., Brown et al. U.S. Publ. No. 2008/0005919 and Flynn et al. U.S. Pat. No. 5,846,271), a translucent housing has been used to enable the user to see color changes of the desiccant to know when to change the desiccant without requiring disassembly. In still other structures, indicators have been installed in the air line itself downstream from the filters which detect and in some manner indicate that undesirable particles (e.g., water) are still in the compressed gas even after passing through all the filters, such as by use of color changing desiccants.

Moreover, multiple stage in-line filters in which the above described filters may be one stage have also been used (with, e.g., stages between the gas compressor and the compressed air output, such as a paint spray painter) with different stage components used to filter different particulates. Rhodes U.S. Pat. No. 3,791,105, Daniels U.S. Pat. No. 4,822,387 and Flynn et al. U.S. Pat. No. 5,403,387, for example, show such multi-stage filters, each stage having a separate housing/pressure vessel.

Single cartridges have also been provided with multiple filtering materials, such as activated charcoal for filtering oil particles and desiccant on opposite sides of a permeable partition such that, for example, the compressed gas first passes through the charcoal to remove oil particles and then through the partition to the desiccant where water is removed. Brown et al. U.S. Publ. No. 2008/0005919 and Flynn et al. U.S. Pat. No. 5,846,271 disclose such cartridges.

In all instances, it is desirable to be able to determine when the filter material needs to be changed without requiring constant disassembly to check the status of the material, including instances in which pressure vessels are used which are not translucent.

SUMMARY OF THE INVENTION

In one aspect of the present invention, an apparatus is provided for removing moisture from a gas, including an elongate housing removably securable to a connection cap, a removable filter housing in the elongate housing with moisture removing material in the filter housing, and an indicator indicating that the apparatus is not removing at least some moisture. The cap has a gas inlet and a gas outlet and the filter housing has an outlet removably connectable to the connection cap to connect the filter outlet to the connection cap gas outlet and an inlet to the connection cap gas inlet. The indicator includes a clear or translucent indicator housing secured to the connection cap, an indicator material in the indicator housing, and an indicator inlet and an indicator outlet through the connection cap connecting the connection cap gas outlet to the indicator housing. The indicator material is adapted to change color when moisture is present in the indicator material to provide a visual indication on the connection cap when moisture is getting past the moisture removing material in the filter housing. The indicator inlet includes an aspirator tube extending into the path of gas flowing through the connection cap gas outlet, whereby gas flows from the connection cap gas inlet into the elongate housing around the filter housing to the filter housing inlet then through the filter housing to the filter housing outlet to and out the connection cap gas outlet, with a portion of the gas in the connection cap gas outlet flowing into the indicator housing via the indicator inlet aspirator tube.

In one form of this aspect of the invention, the indicator housing is removably secured to the connection cap whereby moisture indicating material and indicator material are adapted to be replaced when the indicator material indicates that moisture is getting past the moisture removing material.

In another form of this aspect of the invention, the filter housing with moisture removing material and the indicator housing with indicator material are adapted to be replaced in the apparatus when the indicator material indicates that moisture is getting past the moisture removing material.

In still another form of this aspect of the invention, the moisture removing material and the indicator material are desiccants.

In yet another form of this aspect of the invention, the filter housing separates the elongate housing gas inlet from the elongate housing gas outlet whereby all gas passing from the elongate housing gas inlet to the elongate housing gas outlet must pass through the moisture removing material in the filter housing.

In another form of this aspect of the invention, the elongate housing is a cylinder closed on one end and open on the other end, the closure cap is removably secured over the elongate housing open end, and the filter housing is a cylinder having a diameter less than the elongate housing diameter to define an annular space inside the elongate housing and around the filter housing when the filter housing is connected to the connection cap, the filter housing outlet being at one end where connected to the connection cap and the filter housing inlet being at the opposite end of the filter housing.

In still another form of this aspect of the invention, the indicator material color when dry is a similar color to that of the elongate housing connection cap, and the indicator material color when saturated with moisture is significantly different from the color of the elongate housing connection cap color.

In a further form of this aspect of the invention, a replacement filter housing and moisture removal material adapted for use with the above described apparatus are provided, wherein the filter housing separates the elongate housing gas inlet from the elongate housing gas outlet whereby all gas passing from the elongate housing gas inlet to the elongate housing gas outlet must pass through the moisture removing material in the filter housing whereby any gas reaching the closure cap gas outlet and aspirator tube will have passed through the filter housing and enclosed moisture removing material.

In another aspect of the present invention, an apparatus for removing moisture and oil from a gas is provided, including an elongate housing removably securable to a connection cap, the cap having a gas inlet and a gas outlet, and a removable filter housing in the elongate housing. The filter housing has an outlet removably connectable to the connection cap to connect the filter outlet to the connection cap gas outlet, and an inlet to the connection cap gas inlet, with a sintered disk between oil removing material in the filter housing at the filter housing inlet and moisture removing material. The filter housing is translucent at least sufficiently to externally see visual indication that either of the moisture removing material and oil removing material can no longer remove oil or moisture.

Other objects, features, and advantages of the invention will become apparent from a review of the entire specification, including the appended claims and drawings.

DETAILED DESCRIPTION OF THE PREFERRED EMBODIMENT

A filter 10 for removing oil and moisture from a pressurized air line is disclosed in the Figures.

The filter 10 includes a cylindrical housing or bowl 14 closed on the bottom and open on the top, with an outwardly extending flange 16 around the open top. A cap or head 18 (made, e.g., of aluminum) having an outer thread 20 is suitably securable over the open top of the housing 14. The cap 18 has an inlet 21 and outlet 22 for pressurized air, and defines the flow path of the air through the filter 10 as described in greater detail hereafter.

An annular ring 24 includes an interior thread 28 and has an inwardly extending flange 30 on its bottom, whereby the ring 24 may pass over the outside of the housing 14 and screw together with the cap outer thread 20 to secure the cap 18 over the housing top opening by overlapping of the housing and ring flanges 16, 30. A suitable sealing material 34 (see FIG. 3) such as an O-ring may be interposed between the flanges 16, 30 to maintain an airtight seal of the cap 18 on the housing 14 to form a pressure chamber.

A filter cartridge 40 includes a clear or translucent tube 50 closed on opposite ends by top end and bottom end caps 54, 58, respectively, to retain advantageous filtering material in the tube 50.

The bottom end cap 58 includes openings 59 through which air may pass. A stainless steel mesh screen 60 is disposed on top of the bottom end cap 58, with oil removing activated charcoal 64 (e.g., charcoal pellets) supported above the screen 60. Advantageously, the screen 60 may be an 80×80 mesh stainless steel screen which blocks dirt, debris, pipe scale and rust from passing therethrough while also retaining the charcoal 64 thereabove.

The bed of activated charcoal 64 acts as a coalescing element in the filter cartridge 40 which may advantageously trap all oil and oil vapors down to about 0.00015 ppm. In units of typical size in the market, 0.08 to 0.13 pounds of such charcoal pellets may, for example, be included.

Above the bed of carbon 64 is a sintered disk 68 which allows air to flow up through the disk 68 while also preventing migration of carbon dust and restrained oils up from the bed. Advantageously, the disk 68 may be a 250 micron sintered bronze disk.

Above the sintered disk 68 is a bed of color indicating silica gel 72 which is a desiccant suitable to adsorb moisture in the air passing through the filter cartridge 40. Such gel 72 may lower the dew point of the air passing through the gel 72 to change water vapor to liquid which the gel 72 will adsorb. For example, known suitable desiccants can lower the dew point of compressed air to −40 degrees F. to effectively remove convert all water vapor in the air passing therethrough to liquid which the gel 72 will adsorb. In units of typical size in the market, 1.6 pounds or 1 quart to 2.7 pounds or 1.5 quarts of such desiccant may, for example, be included.

One color indicating silica gel 72 such as is known in the art is blue which will, as it adsorbs more moisture, begin to change to pink, allowing for a visual indication that the desiccant is working. As the desiccant changes to pink, the dew point will rise, and the desiccant starts to become saturated with moisture, with the increasingly pink color thus serving to provide a visual indication not only that the desiccant is working as desired but also when the filter cartridge 40 will need replacement. For example, when the desiccant as seen through the clear tube 50 is substantially pink, that color will verify that the desiccant is substantially saturated and needs replacing.

Multiple additional filter elements are also included beneath the top end cap 54 and above the desiccant 72 to prevent any desiccant dust or other debris from migrating downstream in the air flow (i.e., exiting the filter cartridge 40. Advantageously, these filter elements may consist of two, 1 micron filter elements 78 layered between two or more stainless steel (e.g., 80×80) mesh screens 82, 84. Finally, pressurized air which flows through the filter elements 78 and screens 82, 84 exits the filter cartridge 40 through openings 86 in the top end cap 54.

The filter cartridge 40 thus may provide five stages and eight total layers of filtration inside a single pressure vessel 14.

The top end cap 54 includes a central threaded opening 88 which may be secured to the filter cap 18 by threading onto a threaded rod 90 which is itself suitably secured on its top end to the filter cap 18. Advantageously, the top end cap 54 may be of plastic so that it may suitably deform to seal against the filter cap 18 as described below, in which case a suitable metal insert may be included to ensure reliable and secure threading onto the rod 90, which may itself be of a suitable metal.

Figure 1:
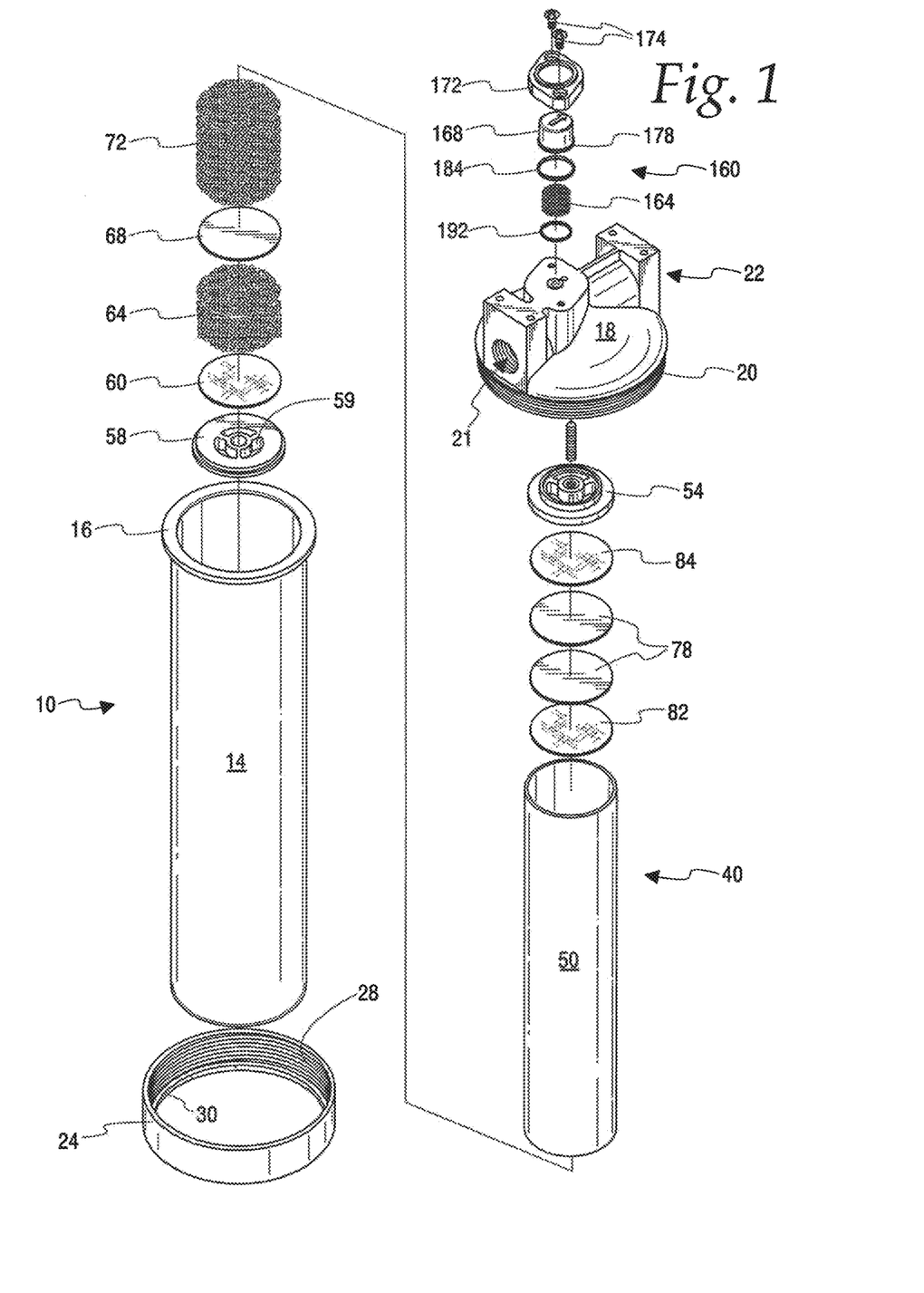
FIG. 1 is an exploded view of applicant's new filter.
Figure 2:
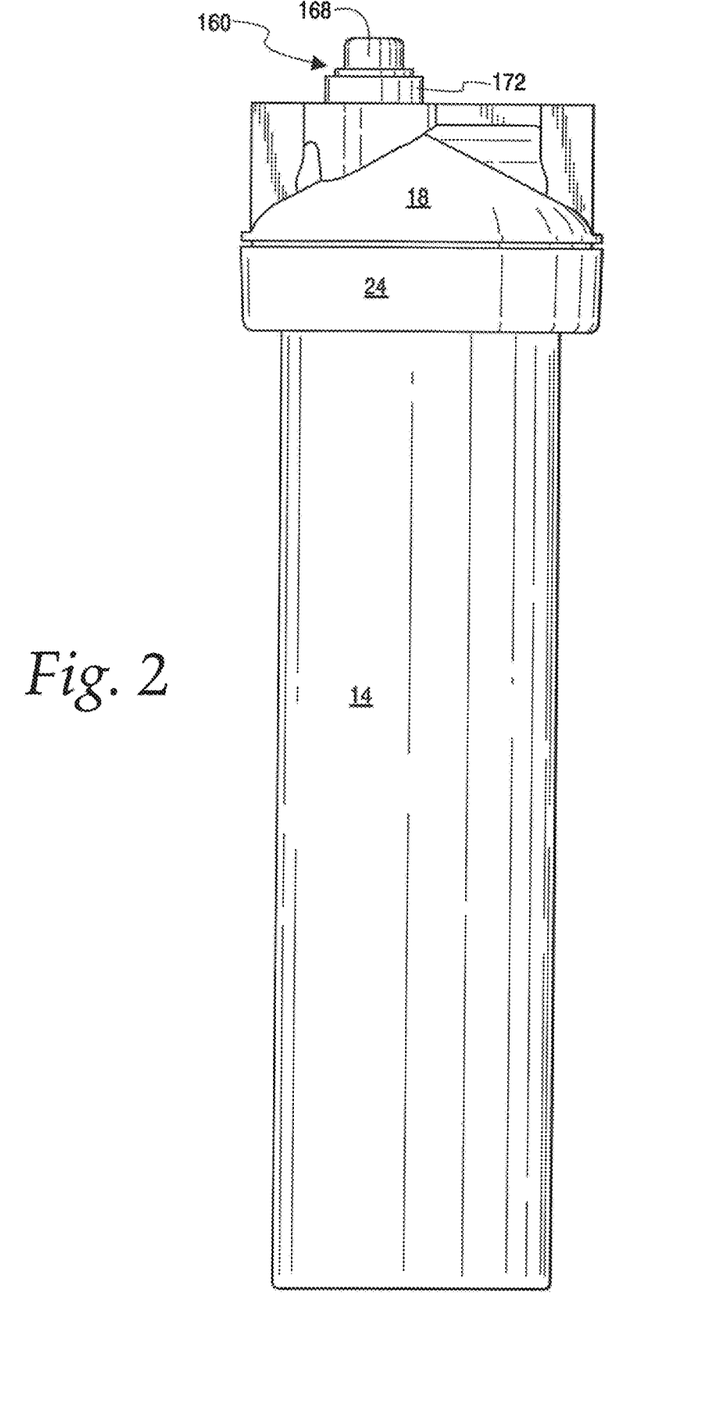
FIG. 2 is a side view of the assembled filter of FIG. 1.
Figure 3:
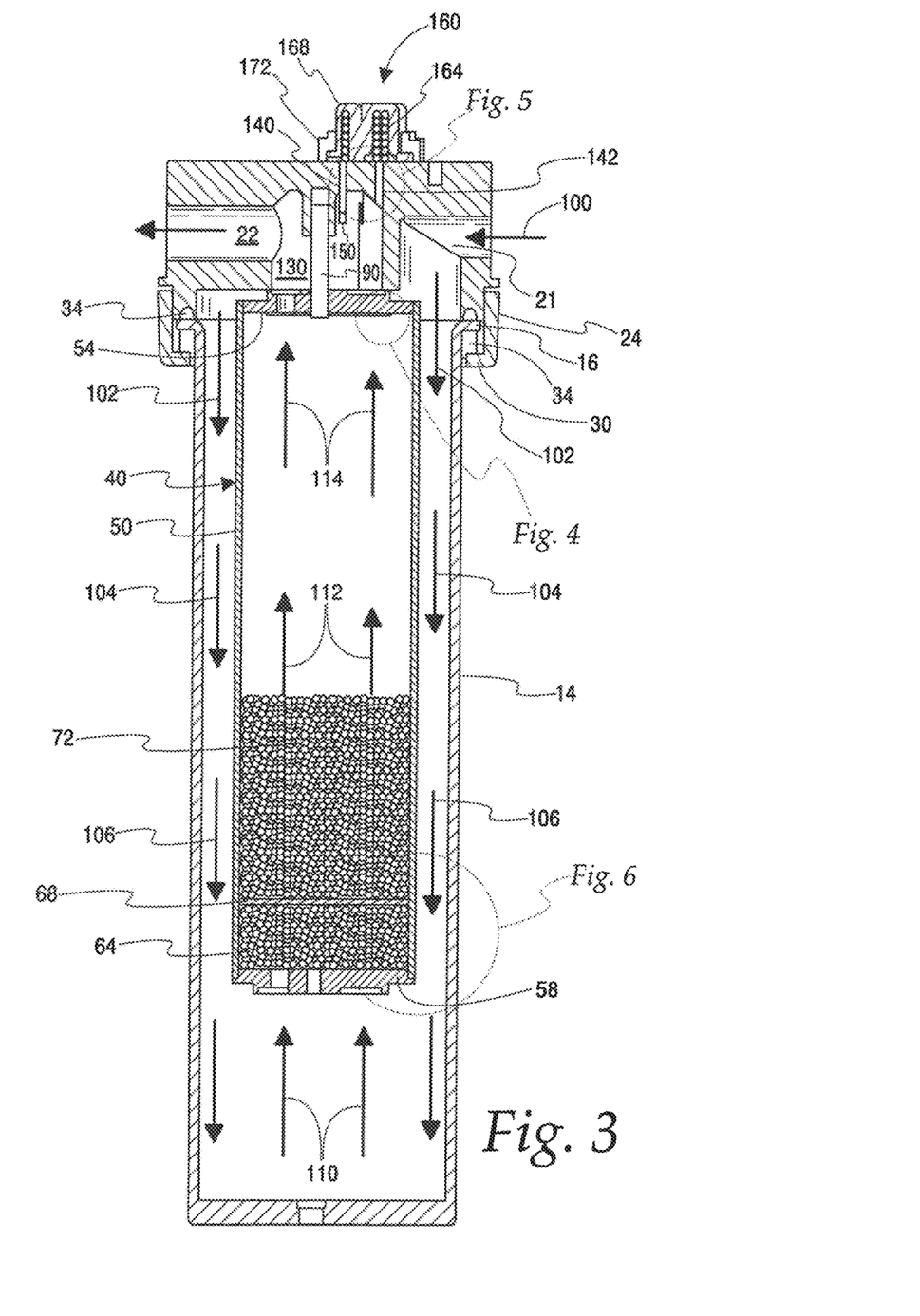
FIG. 3 is a cross-sectional view of the filter of FIG. 1 showing air flow therethrough.
Figure 4:
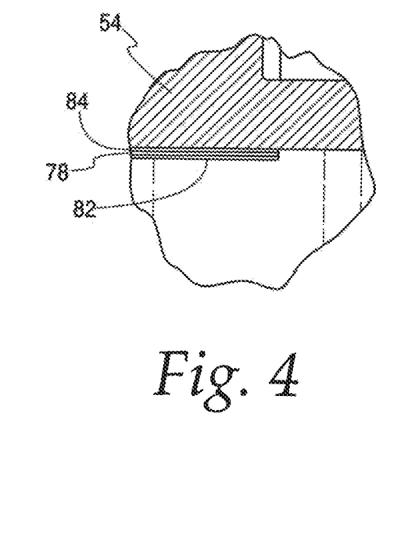
FIGS. 4-6 are detailed views of portions of FIG. 3 where indicated on FIG. 3
Figure 5:
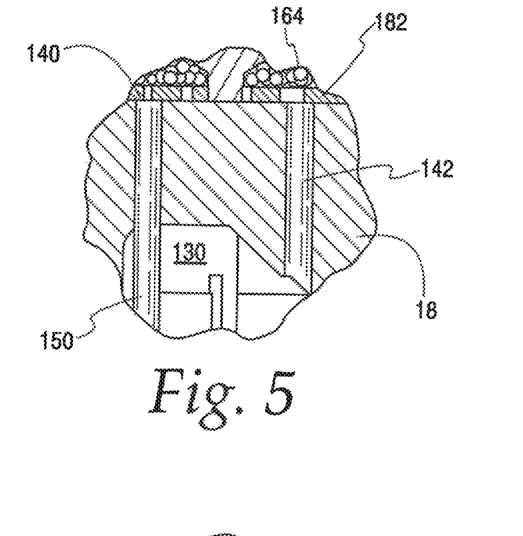
Figure 6:
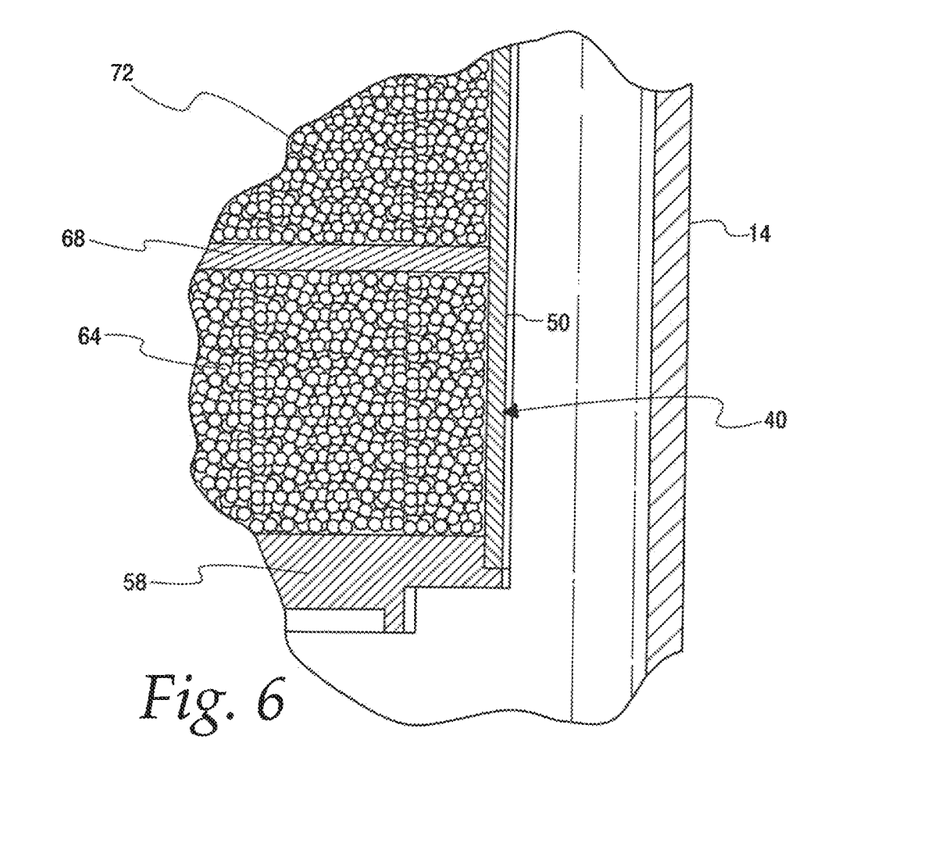

As illustrated in FIG. 3, the filter cap 18 defines two separated flow paths. Specifically, the pressurized air inlet 21 directs flow into an annular space 92 around the periphery of the cap 18 (see arrows 94), whereby air flows down and around outer periphery of the interior of the housing 14 (see arrows 100, 102, 104, 106). At the bottom of the housing 14, air flow continues by reversing upward through the interior of the filter cartridge 40 (see arrows 110, 112, 114), with the air exiting the cartridge 40 through the top end cap openings 86.

Figure 7:
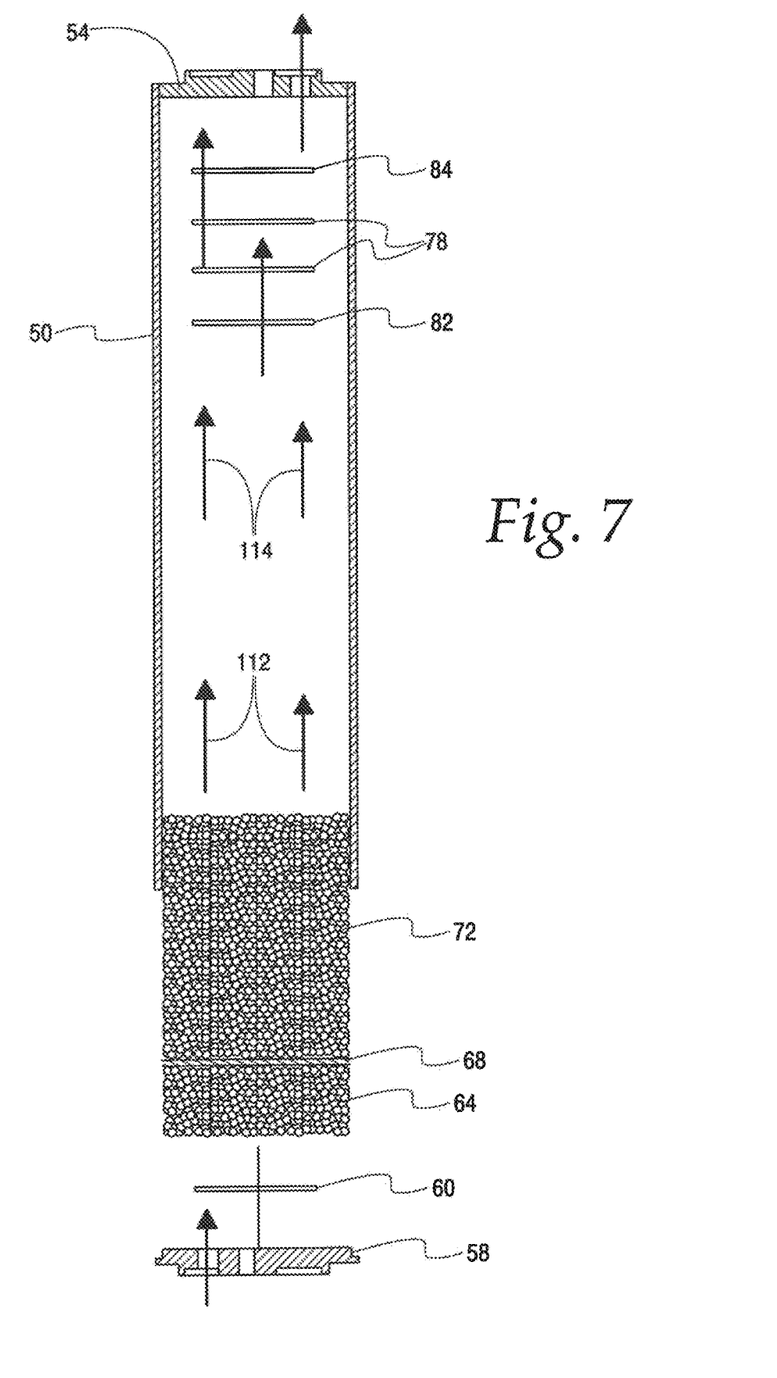
FIG. 7 is an exploded view of the cartridge of the filter.
Figure 8:
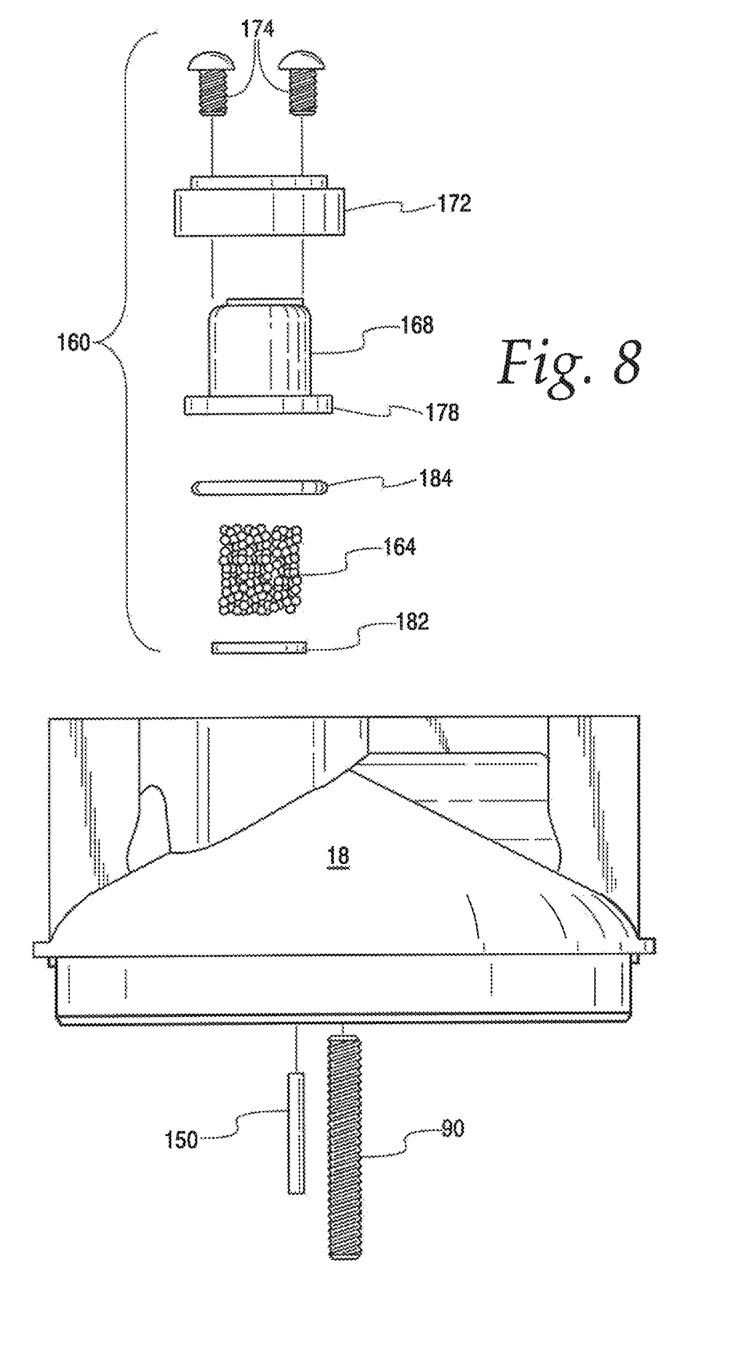
FIG. 8 is an exploded view of the cap or dome of the filter.
Figure 9:
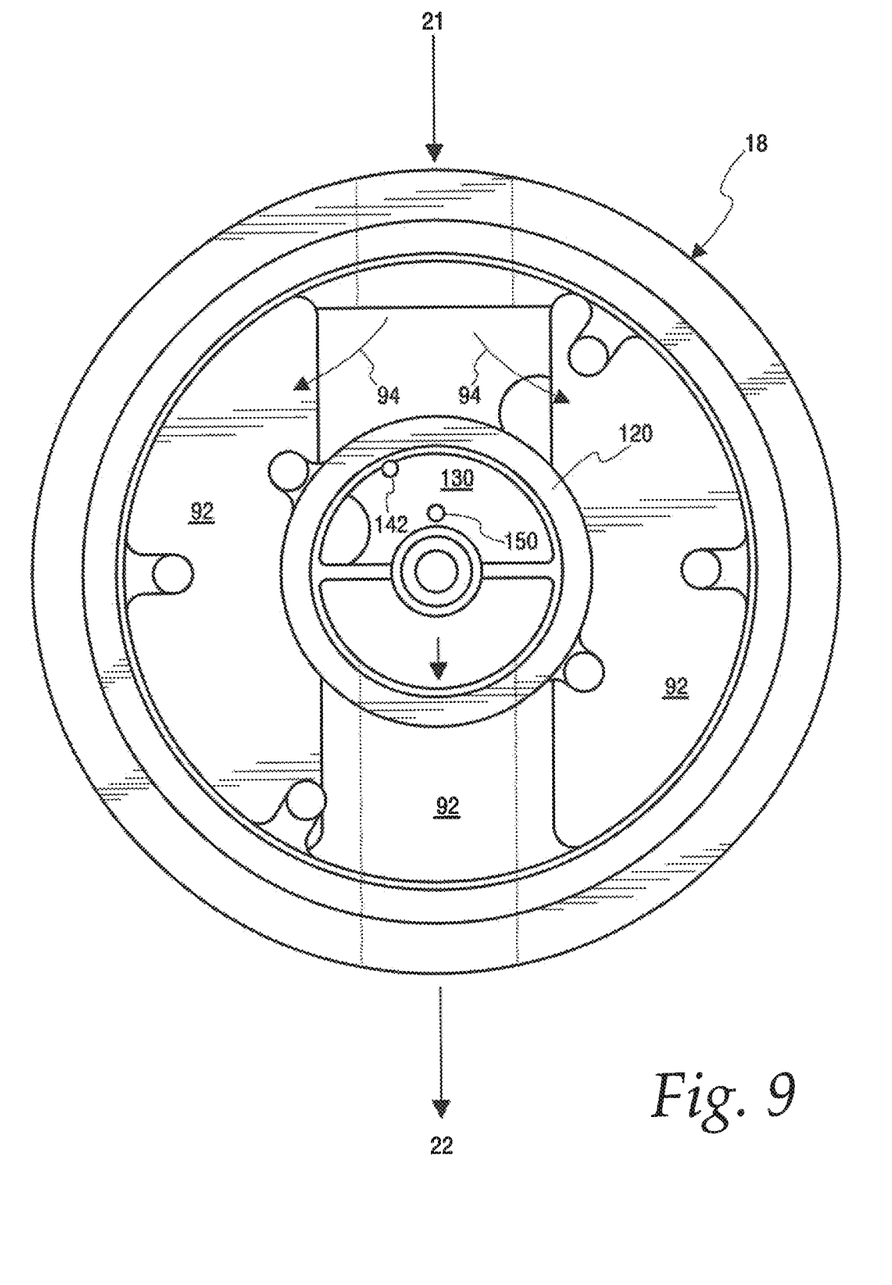
FIG. 9 is a bottom view of the cap or dome of FIG. 8.

The top end cap 54 is screwed tightly onto the filter cap 18 so that the outer periphery of the top end cap 54 forms a seal around an annular surface 120 on the bottom interior of the filter cap 18 (see FIGS. 3 and 7) so that air exiting the cartridge 40 will flow through an exit passage 130 and then ultimately out the outlet 22.

Advantageously, the exit passage 130 includes two holes 140, 142 through the top of the cap 18. Extending into one hole 140 is an aspirator tube 150 which extends into the air flow path to allow for a small sampling of exiting air to be diverted up through the cap 18 to an integral moisture indicator 160. The second hole 142 allows air flow from the moisture indicator 160 back down through the cap 18 and into the exit passage 130 as described below.

Specifically, the moisture indicator 160 may advantageously include a color changing desiccant 164 in a transparent or translucent dome or housing 168. A collar 172 secures the dome 168 to the filter cap 18 (e.g., by screws 174 screwed into the filter cap 18 to secure the collar 172 down on the cap 18, trapping the bottom outer lip 178 of the dome 168 beneath the collar 172). A suitable disk screen 182 allows flow into and out of the dome 168 and desiccant 164 (while retaining the desiccant 164 in the dome 168), and a suitable seal such as an O-ring 184 seal such air flow from leaking from the moisture indicator 160.

It should thus be appreciated that when the desiccant 72 of the filter cartridge 40 becomes saturated, some moisture will begin to pass out of the filter cartridge 40, and thus also a sampling of that air with some moisture in the exit passage 130 will also flow up into the aspirator tube 150 and through the moisture indicator 160, causing the desiccant 164 to begin to change from, for example, blue to pink. Such readily visible change clearly indicates to any user that the filter 10 is no longer adequately filtering moisture from the pressurized air, signaling that the filter cartridge 40 probably needs changing. Thus, the user will know to unscrew the annular ring 24 from the cap outer thread 20 to remove the housing 14 and expose the filter cartridge 40 to confirm (by seeing through the clear or translucent tube 50 whether the cartridge desiccant 72 has substantially changed to pink) whether the filter cartridge 40 needs to be changed.

It should also be appreciated that when the desiccant 164 used in the moisture indicator is a similar color to the cap 18 (e.g., if the cap 18 is black and the desiccant 164 is dark blue) and the desiccant 164 changes to a significantly different color from the cap 18 when moisture is present (e.g., when the desiccant 164 changes to pink), then the moisture indicator 160 will particularly noticeably and clearly indicate that the filter cartridge 40 needs to be replaced.

Moreover, the filter cartridge 40 of the present invention, which not only removes moisture but also oil, may be used with a single pressure vessel (housing 14), including those heretofore intended, for example, to remove only moisture, obviating the need for a second (oil filtering) pressure vessel housing, all while allowing visual observation of both filtering materials (charcoal 64 and desiccant 72) to determine saturation of either, whether oil bleeding into the desiccant or the desiccant fully changing color.

The invention claimed is:

1. An apparatus for removing moisture from a gas, comprising:
    an elongate housing removably securable to a connection cap, said cap having a gas inlet and a gas outlet;
    a removable filter housing in said elongate housing, said filter housing having an outlet removably connectable to said connection cap to connect said filter outlet to said connection cap gas outlet and an inlet to said connection cap gas inlet;
    moisture removing material in said filter housing; and
    an indicator indicating that the apparatus is not removing at east some moisture, including
        a clear or translucent indicator housing secured to said connection cap,
        an indicator material in said indicator housing, said indicator material being adapted to change color when moisture is present in said indicator material to provide a visual indication on said connection cap when moisture is getting past the moisture removing material in said filter housing, and an indicator inlet and an indicator outlet through said connection cap connecting said connection cap gas outlet to said indicator housing, said indicator inlet including an aspirator tube extending into the path of gas flowing through said connection cap gas outlet, whereby gas flows from said connection cap gas inlet into said elongate housing around said filter housing to said filter housing inlet then through said filter housing to said filter housing outlet to and out said connection cap gas outlet, with a portion of said gas in said connection cap gas outlet flowing into said indicator housing via said indicator inlet aspirator tube.

2. The moisture removing apparatus of claim 1, wherein said indicator housing is removably secured to said connection cap whereby moisture indicating material and indicator material are adapted to be replaced when said indicator material indicates that moisture is getting past the moisture removing material.

3. The moisture removing apparatus of claim 2, wherein said filter housing with moisture removing material and said indicator housing with indicator material are adapted to be replaced in said apparatus when said indicator material indicates that moisture is getting past the moisture removing material.

4. The moisture removing apparatus of claim 1, wherein the moisture removing material and the indicator material are desiccants.

5. The moisture removing apparatus of claim 1, wherein said filter housing separates said elongate housing gas inlet from said elongate housing gas outlet whereby all gas passing from said elongate housing gas inlet to said elongate housing gas outlet must pass through the moisture removing material in the filter housing.

6. The moisture removing apparatus of claim 1, wherein:
said elongate housing is a cylinder closed on one end and open on the other end;
said closure cap is removably secured over said elongate housing open end; and
said filter housing is a cylinder having a diameter less than said elongate housing diameter to define an annular space inside said elongate housing and around said filter housing when said filter housing is connected to said connection cap, said filter housing outlet being at one end where connected to the connection cap and said filter housing inlet being at the opposite end of the filter housing.

7. The moisture removing apparatus of claim 1, wherein said indicator material color when dry is a similar color to that of the elongate housing connection cap, and said indicator material color when saturated with moisture is significantly different from the color of the elongate housing connection cap color.

8. The moisture removing apparatus of claim 1, wherein said filter housing separates said elongate housing gas inlet from said elongate housing gas outlet whereby all gas passing from said elongate housing gas inlet to said elongate housing gas outlet must pass through the moisture removing material in the filter housing whereby any gas reaching said closure cap gas outlet and aspirator tube will have passed through said filter housing and enclosed moisture removing material.

9. An apparatus for e oving moisture and oil from a gas, comprising:
an elongate housing removably securable to a connection cap, said cap having a gas inlet and a gas outlet;
a removable filter housing in said elongate housing, said filter housing having
an outlet removably connectable to said connection cap to connect said filter outlet to said connection cap gas outlet, and
an inlet to said connection cap gas inlet;
oil removing material in said filter housing at said filter housing inlet,
moisture removing material in said filter housing;
a sintered disk between said oil removing material and said moisture removing material; and
an indicator indicating that the apparatus is not removing at least some moisture, including
a clear or translucent indicator housing secured to said connection cap,
an indicator material in said indicator housing, said indicator material being adapted to change color when moisture is present in said indicator material to provide a visual indication on said connection cap when moisture is getting past the moisture removing material in said filter housing, and
an indicator inlet and an indicator outlet through said connection cap connecting said connection cap gas outlet to said indicator housing, said indicator inlet including an aspirator tube extending into the path of gas flowing through said connection cap gas outlet, whereby gas flows from said connection cap gas inlet into said elongate housing around said filter housing to said filter housing inlet then through said filter using to said filter housing outlet to and out said connection cap gas outlet, with a portion of said gas in said connection cap gas outlet flowing into said indicator housing via said indicator inlet aspirator tube; and
wherein said filter housing is translucent at least sufficiently to externally see visual indication that either or both of said moisture removing material and oil removing material can no longer removing oil or moisture.

* * * * *

UNITED STATES PATENT AND TRADEMARK OFFICE
CERTIFICATE OF CORRECTION

PATENT NO. : 10,300,425 B2
APPLICATION NO. : 15/274578
DATED : May 28, 2019
INVENTOR(S) : Larry Adams et al.

Page 1 of 1

It is certified that error appears in the above-identified patent and that said Letters Patent is hereby corrected as shown below:

In the Claims

Claim 1, (Column 6, Line 59), delete "east" and substitute therefor "least".

Claim 9, (Column 8, Line 10), delete "e oving" and substitute therefor "removing"; and
(Column 8, Line 42), delete "using" and substitute therefor "housing".

Signed and Sealed this
Second Day of July, 2019

Andrei Iancu
*Director of the United States Patent and Trademark Office*